United States Patent
Tavridis et al.

(10) Patent No.: US 10,778,522 B2
(45) Date of Patent: Sep. 15, 2020

(54) ENDPOINT-BASED MECHANISM TO APPLY NETWORK OPTIMIZATION

(71) Applicant: salesforce.com, inc., San Francisco, CA (US)

(72) Inventors: Gabriel Tavridis, San Francisco, CA (US); Kartikeya Chandrayana, San Francisco, CA (US); Maria Garcia Cerdeno, Redwood City, CA (US); Russell Larsen, Santa Clara, CA (US); Satish Raghunath, Sunnyvale, CA (US); Shauli Gal, Mountain View, CA (US); Wojciech Koszek, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 29 days.

(21) Appl. No.: 15/841,099

(22) Filed: Dec. 13, 2017

(65) Prior Publication Data
US 2019/0182114 A1    Jun. 13, 2019

(51) Int. Cl.
*G06F 15/177*  (2006.01)
*H04L 12/24*   (2006.01)
*H04L 12/26*   (2006.01)
*G06N 20/00*   (2019.01)

(52) U.S. Cl.
CPC ......... *H04L 41/0823* (2013.01); *G06N 20/00* (2019.01); *H04L 41/16* (2013.01); *H04L 43/04* (2013.01); *H04L 43/06* (2013.01)

(58) Field of Classification Search
CPC ......... H04L 43/04; H04L 43/06; H04L 43/08; H04L 43/0805; H04L 43/0811; H04L 43/0823; H04L 43/0876; H04L 43/0882; H04L 43/0888; H04L 43/0894; H04L 43/10
See application file for complete search history.

(56) References Cited

U.S. PATENT DOCUMENTS

| | | | |
|---|---|---|---|
| 10,164,842 B2 * | 12/2018 | Rizzi | H04W 24/08 |
| 2003/0093709 A1 * | 5/2003 | Ogawa | G06F 11/0709 714/4.3 |
| 2008/0130794 A1 * | 6/2008 | Chong | G01S 5/0221 375/317 |
| 2016/0164896 A1 * | 6/2016 | Baldonado | H04L 63/1425 726/23 |
| 2018/0139116 A1 * | 5/2018 | Ricci | H04L 43/16 |
| 2018/0270347 A1 * | 9/2018 | Rangarajan | H04L 41/5067 |

* cited by examiner

*Primary Examiner* — Dhairya A Patel
(74) *Attorney, Agent, or Firm* — Wong & Rees LLP; Kirk D. Wong

(57) ABSTRACT

A dynamic approach to optimizing configuration of network parameters is presented. By gathering operational contexts and aggregating optimized network performance data against a baseline, a training data set may be generated. Client-side policies are determined, in part, by applying machine learning techniques on the training data set to achieve desired outcomes. Data delivery strategies are compiled at user devices to deliver content using the optimized network configuration values based on the operating contexts.

20 Claims, 5 Drawing Sheets

ENDPOINT-BASED MECHANISM TO APPLY NETWORK OPTIMIZATION

TECHNOLOGY

The present invention relates generally to optimizing network policies in content delivery, and in particular, to an endpoint-based mechanism to apply the optimized network policies.

BACKGROUND

Cellular networks are very volatile and diverse. Due to the nature of the wireless channel, link conditions change at a fine timescale. Metrics such as latency, jitter, throughput, and losses are hard to bound or predict. The diversity comes from the various network technologies, plethora of devices, platforms, and operating systems in use.

Techniques that rely on compression or right-sizing content do not address the fundamental issues of network volatility and diversity as they impact the transport of data. Irrespective of the savings in compression, the data still weathers the vagaries of the network, operating environment, and end device.

Mobile applications as well as web applications are powered by cloud data: images, video, audio, messaging, and so forth. The ability to quickly exchange—download or upload—assets with the cloud is a key factor in the user experience. While various parameters may affect network latency, there are no "golden values" that can be a "one size fits all" approach. As a result, mobile application developers lack methods and techniques to optimize operational dimensions that affect mobile performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
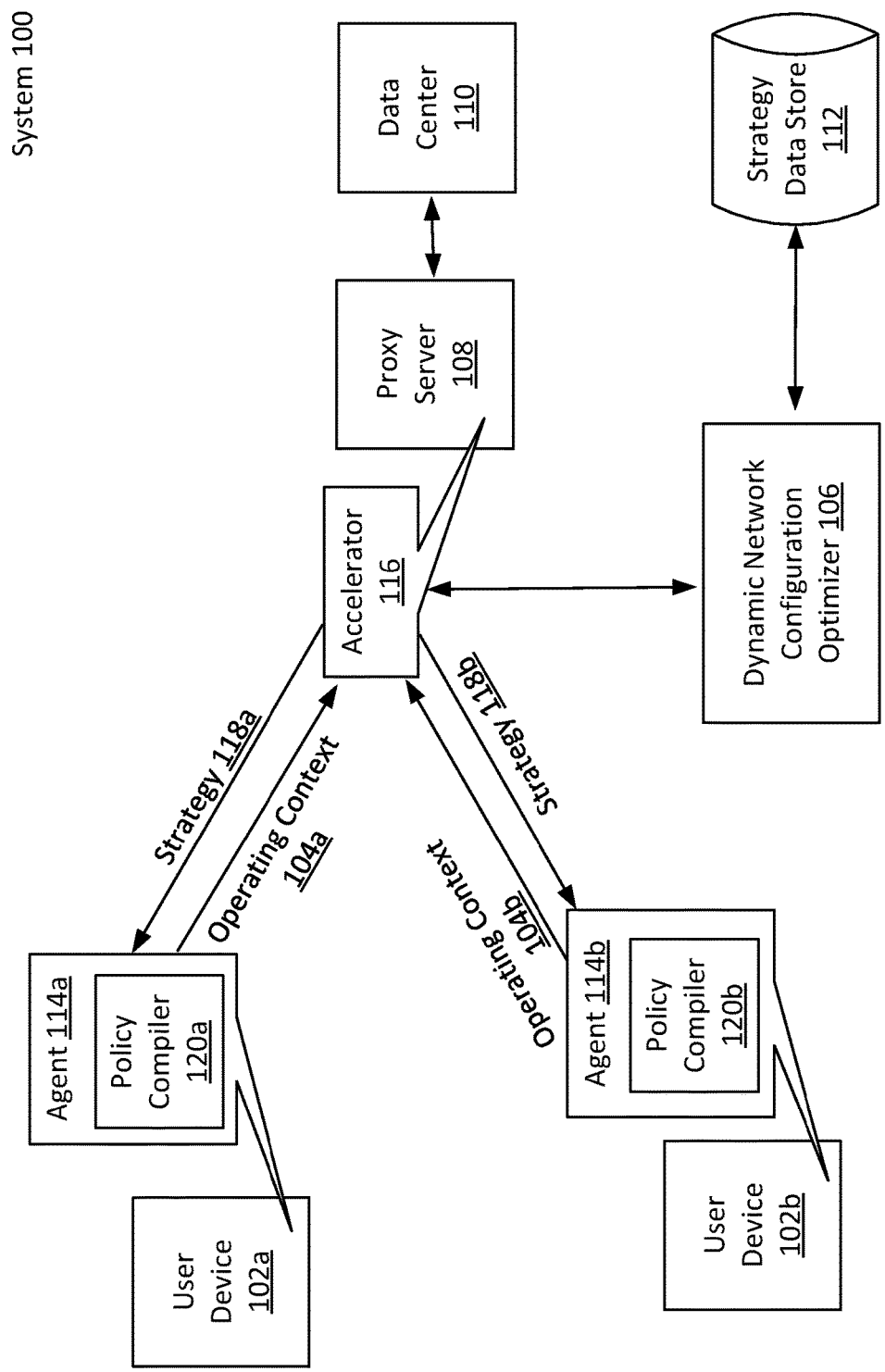
FIG. 1 illustrates a high-level block diagram, according to an embodiment of the invention.

Example embodiments, which relate to cognitive analysis of network performance data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. USING OPERATIONAL CONTEXTS TO IDENTIFY STRATEGIES FOR OPTIMIZATION
3. DYNAMICALLY GENERATING STRATEGIES FOR OPTIMIZATION USING MACHINE LEARNING
4. CONVERGENCE ON OPTIMUM STRATEGY FOR OPERATIONAL CONTEXTS
5. IMPLEMENTATION MECHANISMS—HARDWARE OVERVIEW
6. EQUIVALENTS, EXTENSIONS, ALTERNATIVES AND MISCELLANEOUS

1. GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Modern data transport networks feature a huge variety of network technologies, Internet service providers (ISPs), telecommunication infrastructure, end-user devices, and software. Some of the common network technologies include cellular networks (e.g., LTE, HSPA, 3G, older technologies, etc.), WiFi (e.g., 802.11xx series of standards, etc.), satellite, microwave, etc. In terms of devices and software, there are smartphones, tablets, personal computers, network-connected appliances, electronics, etc., that rely on a range of embedded software systems such as Apple iOS, Google Android, Linux, and several other specialized operating systems. There are certain shared characteristics that impact data delivery performance:

a. Many of these network technologies feature a volatile wireless last mile. The volatility manifests itself in the application layer in the form of variable bandwidth, latency, jitter, loss rates and other network related impairments.

b. The diversity in devices, operating system software and form factors results in a unique challenge from the perspective of user experience.

c. The nature of content that is generated and consumed on these devices is quite different from what was observed with devices on the wired Internet. The new content is very dynamic and personalized (e.g., adapted to location, end-user, other context sensitive parameters, etc.).

A consequence of these characteristics is that end-users and applications experience inconsistent and poor performance. This is because most network mechanisms today are not equipped to tackle this new nature of the problem. In terms of the transport, today's client and server software systems are best deployed in a stable operating environment where operational parameters either change a little or do not change at all. When such software systems see unusual network feedback they tend to over-react in terms of remedies. From the perspective of infrastructure elements in the network that are entrusted with optimizations, current techniques like caching, right sizing, and compression fail to deliver the expected gains. The dynamic and personalized nature of traffic leads to low cache hit-rates and encrypted traffic streams that carry personalized data make content modification much harder and more expensive.

Modern heterogeneous networks feature unique challenges that are not addressed by technologies today. Unlike the wired Internet where there was a stable operating environment and predictable end device characteristics, modern heterogeneous networks require a new approach to optimize data delivery. To maximize improvement in perceived network performance for various applications, through asset download time and network throughput, various parameters may be configured as a policy strategy using a data driven approach by analyzing prior operational contexts. Because wireless networks are volatile and non-stationary (i.e., statistics change with time), configuring network parameters poses several challenges. The network parameter configuration should be adaptive to capture volatilities in the wireless network, but also stable and not overly sensitive to short term fluctuations. Further, raw network traffic data does not capture the performance in improvement of throughput and download complete time of a particular set of operational contexts. Methods and techniques described herein provide situational policy strategies for client-based compilation of network parameter configurations using machine learning techniques that operate on past data. In various embodiments, the techniques and methods described here work on wireless cellular and WiFi networks, individually and in combination.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. USING OPERATIONAL CONTEXTS TO IDENTIFY STRATEGIES FOR OPTIMIZATION

The performance of data delivery is closely tied to the operating conditions within which the end-device is operating. With ubiquitous wireless access over cellular and WiFi networks, there is a lot of volatility in operating conditions, so acceleration techniques should adapt to such a network by adapting to these conditions, e.g., the performance achievable over a private WiFi hotspot is very different from that with a cellular data connection. An accelerator 116, as illustrated in FIG. 1, dynamically adapts to these conditions and selects optimal strategies 118 based on the operating context 104.

An operating context 104 captures the information about the operating conditions in which data transfer requests are being made. This includes, but not limited to, any combination of:

Type of device, e.g., iPhone, iPad, Blackberry, etc.
    This may also include the version of the device and manufacturer information.

Device characteristics, e.g., the type of its modem, CPU/GPU, encryption hardware, battery, NFC (Near Field Communication) chipset, memory size and type or any other hardware information that impacts performance Mobility of device, e.g., whether the device is on a moving vehicle/train etc., or is stationary/semi-stationary.

Operating System on the device.

Operating System characteristics, e.g., buffering, timers, public and hidden operating system facilities (APIs), etc.
    This may also include operating system limitations such as number of simultaneous connections allowed to a single domain, etc.

Usage information related to various device elements, e.g., Memory, Storage, CPU/GPU etc.

Battery charge and mode of powering the device.

Time of day.

Location where available.

IP Address and port numbers.

Network type, e.g., WiFi or Cellular, or 3G/4G/LTE, etc., or Public/Home WiFi, etc.
    SSID (Service Set Identifier) in WiFi networks.
    802.11 network type for WiFi networks.

Service Provider information, e.g., AT&T or Verizon for cellular, Time Warner or Comcast for WiFi, etc.

Strength of signal from the access point (e.g., Wi-Fi hot spot, cellular tower, etc.) for both upstream and downstream direction.

Cell-Tower or Hot-Spot identifier in any form.

Number of sectors in the cell tower or hot spot.

Spectrum allocated to each cell tower and/or sector.

Any software or hardware limitation placed on the hot-spot/cell tower.

Any information on the network elements in the path of traffic from device to the content server.

Firewall Policy rules, if available.

Any active measurements on the device, e.g., techniques that measure one-way delay between web-server and device, bandwidth, jitter, etc.

Medium of request, e.g., native app, hybrid app, web-browser, etc.
    Other information describing the medium, e.g., web browser type (e.g., Safari, Chrome, Firefox etc.), application name, etc.

Any other third party software that is installed on the device which impacts data delivery performance.

Content Type, e.g., image, video, text, email, etc.
    Also includes the nature of content if it is dynamic or static.

Content Location, e.g., coming from origin server or being served from a CDN (Content Delivery Network).
    In the case of a CDN, any optimization strategies being employed, if available.

Recent device performance statistics, e.g., dropped packets, bytes transferred, connections initiated, persistent/on-going connections, active memory, hard disk space available, etc.

Caching strategies if any, that are available or in use on the device or by the application requesting the content.

In the case of content, where multiple objects have to be fetched to completely display the content, the order in which requests are placed and the order in which objects are delivered to the device. The request method for each of these objects is also of interest.

Concurrency: the maximal number of objects downloaded at the same time

Protocol: HTTPv1, HTTPv2, QUIC or any proprietary transport protocol

Server port: sometimes using non-standard ports is beneficial

Pipelining: starting a new request on a connection before the previous one ended Fail fast: faster retransmission timeouts for requests Based on the operating context, machine learning techniques may be able to recommend, but is not limited to, any combination of: end-device based data delivery strategies and accelerator-based data delivery strategies. There typically are no "golden values" for these parameters that can be hardcoded in the application. Different users of the same application would need different settings, and even a single user would need different settings per the content type it consumes. As mentioned above, operational dimensions that affect mobile performance include network technology (e.g., 3G, HSPA, LTE, etc.), network carrier, location, device type, operating system version, content type, and Uniform Resource Locator (URL) domain.

End-device based data delivery strategies refer to methods deployed by an application (an application could be natively running on the end-device operating system, or running in some form of a hybrid or embedded environment, e.g., within a browser, etc.) to request, receive or, transmit data over the network. These data delivery strategies include, but are not limited to, any combination of:

Methods used to query the location of service point, e.g., DNS, etc.
  This may involve strategies that include, but are not limited to, any combination of: choosing the best DNS servers based on response times, DNS prefetching, DNS refreshing/caching, etc.

Protocols available for data transport, e.g., UDP, TCP, SCTP, RDP, ROHC, etc.

Methods to request or send data as provided by the operating system, e.g., sockets, CFHTTP or NSURL-Connection in Apple's iOS, HttpUrlConnection in Google's Android, etc.

Session oriented protocols available for requests, e.g., HTTP, HTTPS, FTP, RTP, Telnet, etc.

Full duplex communication over data transport protocols, e.g., SPDY, Websockets, etc.

Caching and or storage support provided in the Operating System.

Compression, right sizing or other support in the devices to help reduce size of data communication.

Transaction priorities which outline the order in which network transactions to be completed:
  E.g., this may be a list of transactions where the priority scheme is simply a random ordering of objects to be downloaded.

Content specific data delivery mechanisms, e.g., HTTP Live Streaming, DASH, Multicast, etc.

Encryption support in the device:
  Also includes secure transport mechanisms, e.g., SSL, TLS, etc.

VPN (Virtual Private Network) of any kind where available and/or configured on the device.

Any tunneling protocol support available or in use on the device.

Ability to use or influence rules on the device which dictate how the data needs to be accessed or requested or delivered.
  This includes, but is not limited to, any combination of: firewall rules, policies configured to reduce data usage, etc.

Ability to pick the radio technology to use to get/send data. For example, if allowed, the ability to choose cellular network to get some data instead of using a public Wi-Fi network.

Ability to run data requests or process data in the background.

Threading, locking, and queuing support in the Operating System.

Ability to modify radio power if available.

Presence and/or availability of any error correction scheme in the device.

In cases where middle boxes in the network infrastructure have adverse impact on performance, capabilities on the end-device to deploy mitigations such as encrypted network layer streams (e.g. IPSec, etc.).

A range of parameters determines the performance of tasks such as data delivery. With volatility and diversity, there is an explosion in the number of parameters that may be significant. By isolating parameters, significant acceleration of data delivery may be achieved. Networks, devices and content are constantly changing. Various methods of optimizing data delivery are described in U.S. Patent Publication No. 2014/0304395, entitled "Cognitive Data Delivery Optimizing System," filed Nov. 12, 2013, and which is hereby incorporated by reference in its entirety for all purposes. Embodiments are not tied down by assumptions on the current nature of the system. An dynamic network configuration optimizer 106 may use raw network traffic data to generate an adaptive learning dataset.

FIG. 1 and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral (e.g. "102" in the text refers to reference numerals "102a," and/or "102b" in the figures). Only one user device 102 (end-devices as described above) is shown in FIG. 1 in order to simplify and clarify the description.

As illustrated in FIG. 1, a system 100 includes a user device 102 that communicates data requests through a network 104. A proxy server 108 may receive the data requests and communicate the requests to a data center 110. The dynamic network configuration optimizer 106 may gather information from the proxy server 108 and store information in the strategy data store 112, in an embodiment. For example, with a priori knowledge of the operational contexts, a strategy for network configuration may be determined to be mapped to a set of values. Then, over time, operational contexts may be assigned parameters from these strategies at random and performance data may be stored in the strategy data store 112. The operating context 104 received from agents 114 may be stored as operational context data in the strategy data store 112.

Each database record in the strategy data store 112 may include performance metrics comparing selected strategy performance data against a baseline configuration performance data. For example, data representing outcomes of the download such as the throughput, download complete time, and time to first byte, may be captured in each database record in the strategy data store 112 for each strategy. Performance metrics such as percentage improvement in throughput and download complete time of the strategy applied compared to a baseline operational context may also be stored in the strategy data store 112, in one embodiment.

Other information may also be included in each database record, in other embodiments. Typical sources of data relating to the network environment are elements in the network infrastructure that gather statistics about transit traffic and user devices that connect to the network as clients or servers. The data that can be gathered includes, but is not limited to, any combination of: data pertaining to requests for objects, periodic monitoring of network elements (which may include inputs from external source(s) as well as results from active probing), exceptional events (e.g., unpredictable, rare occurrences, etc.), data pertaining to the devices originating or servicing requests, data pertaining to the applications associated with the requests, data associated with the networking stack on any of the devices/elements that are in the path of the request or available from any external source, etc.

In an embodiment, a component may be installed in the user device 102 (agent 114) that provides inputs about the real-time operating conditions, participates and performs active network measurements, and executes recommended strategies. The agent 114 may be supplied in a software development kit (SDK) and is installed on the user device 102 when an application that includes the SDK is installed on the user device 102. By inserting an agent 114 in the user device 102 to report the observed networking conditions back to the accelerator 116, estimates about the state of the network can be vastly improved. The main benefits of having a presence (the agent 114) on the user device 102 include the ability to perform measurements that characterize one leg of the session, e.g., measuring just the client-to-server leg latency, etc., that are not easily measurable outside of the user device 102.

An accelerator 116 sits in the path of the data traffic within a proxy server 108 and executes recommended strategies in addition to gathering and measuring network-related information in real-time. The accelerator 116 may propagate network policies from the dynamic network configuration optimizer 106 to the proxy server 108, in one embodiment. In another embodiment, the agent 114 may implement one or more network policies from the dynamic network configuration optimizer 106. For example, the optimal number of simultaneous network connections may be propagated as a network policy from the dynamic network configuration optimizer 106 through the network 104 to the agent 114 embedded on the user device 102. As another example, the transmission rate of file transfer may be limited to 20 MB/sec by the accelerator 116 as a network policy propagated by the dynamic network configuration optimizer 106 based on supervised learning and performance metrics. Here, the term "supervised learning" is defined as providing datasets to train a machine to get desired outputs as opposed to "unsupervised learning" where no datasets are provided and data is clustered into classes.

As described above, many parameters may be adjusted by the mobile application on the endpoint, or the client or user devices 102, that may enhance network latency by reducing the time to download various assets powered by cloud data, such as images, audio, video, messaging, and so forth. For example, the maximal number of objects downloaded at the same time, or concurrency as a parameter, may be adjusted at the client. As another example, a choice of transport protocol, including HTTPv1, HTTPv2, QUIC, or any proprietary transport protocol, may be adjusted as a strategy at the user device 102. A further example of a parameter that can be configured at the endpoint device 102 is selecting non-standard server ports. Depending on a set of circumstances, or an operational context 104 in which a user device 102 is operating, selecting a non-standard server port may be beneficial to network latency. Another factor may include pipelining by starting a new request on a connection before the previous request ends. Yet another factor or parameter may be failing fast by generating faster retransmission timeouts for requests. These endpoint specific mechanisms for network stack configuration represent a multitude of strategies that may be used in different combinations based on operating context 104. While examples included here describe interactions with a mobile application, it is understood that other applications, such as web applications and other software applications, may similarly use the techniques described.

In an embodiment, an operating context 104a is sent from an agent 114a on a user device 102 to an accelerator 116 on a proxy server 108 in communication with a data center 110 and a dynamic network configuration optimizer 106. Based on the received operating context 104a, a strategy 118a is selected from a strategy data store 112 by the dynamic network configuration optimizer 106 which is then transmitted to the agent 114a. Strategies in the strategy data store 112 may be configured manually or automatically using machine learning techniques. A policy compiler 120a on the agent 114a then compiles the received strategy 118a at the user device 102a. User devices 102 that even operate on the same network may have different operating contexts 104. Similarly, a single user device 102 may have different operating contexts 104 based on time of day, user using the user device, and network availability.

An example client-side policy (CSP), depicted as a strategy 118 in FIG. 1, is sent from the server 108 via the accelerator 116 to the client, or user device 102 via the agent 114. The client receives the strategy 118 and starts evaluating the CSP that includes programmable code with variables. Variable may come from both the server side and from the client. The CSP engine, depicted as a policy compiler 120 in FIG. 1, is aware which variables belong to the server and which are dynamically substituted by the client during compilation. The policy compiler 120 performs a validity check to ensure the program, or CSP, is correct and understood by the client. For example, if the CSP included a client-side variable that the client does not know about, the CSP engine would detect this and the compilation would fail. As another example, if the server sends the program which the handset, or user device 102, does not yet support, then the compilation would also fail. When the compilation succeeds, the CSP and variables are stored on the user device 102 (e.g., cached). The compiled CSP will run each time the handset makes a request for an asset, such as a video, image, messaging, etc. All incoming requests received after a successful compilation will then be evaluated with the CSP.

The accelerator 116 translates an operational context to one or more optimization strategies. In an embodiment, the user device 102 compiles a received strategy once. As a default, the agent 114 may be configured with initial values for the network stack parameters. Once the agent 114 receives a strategy 118 from the accelerator 116, the agent 114 compiles the strategy 118 using the policy compiler 120 to configure its network stack accordingly. To a viewing user of the user device 102, the network stack configuration is seamless. Some parts of the strategy 118 may be conditional such that a strategy may only apply to specified URLs. For example, a regular expression may detect URLs that have been selected to use QUIC as the transport protocol for network exchanges and/or transactions.

In the strategy data store 112, performance metrics may be stored based on application of strategies to network performance from the view of the endpoint. Once a multitude of performance data associated with data requests between user devices 102 and the data centers 110 are logged in the strategy data store 112, it becomes possible to aggregate this performance data by strategy and operating context. For example, the performance metrics about outcomes of a download network transaction, such as download complete time and time to first byte, may be stored in the strategy data store 112 as performance data associated with a strategy that was applied based on an operational context, in an embodiment. Various statistical aggregations may be used to increase the relevance of a parameter in a strategy as stored in the strategy data store 112 according to different embodiments. Using information related to operational context, a more efficient strategy may be selected by the system to deliver a set of best values based on the operational context. The more efficient and optimized selection of the set of best values improves the overall performance of the specific device making the request for a client side policy. This improves the technology of the client by improving overall network performance above and beyond previous approaches.

3. DYNAMICALLY GENERATING STRATEGIES FOR OPTIMIZATION USING MACHINE LEARNING

Figure 2:
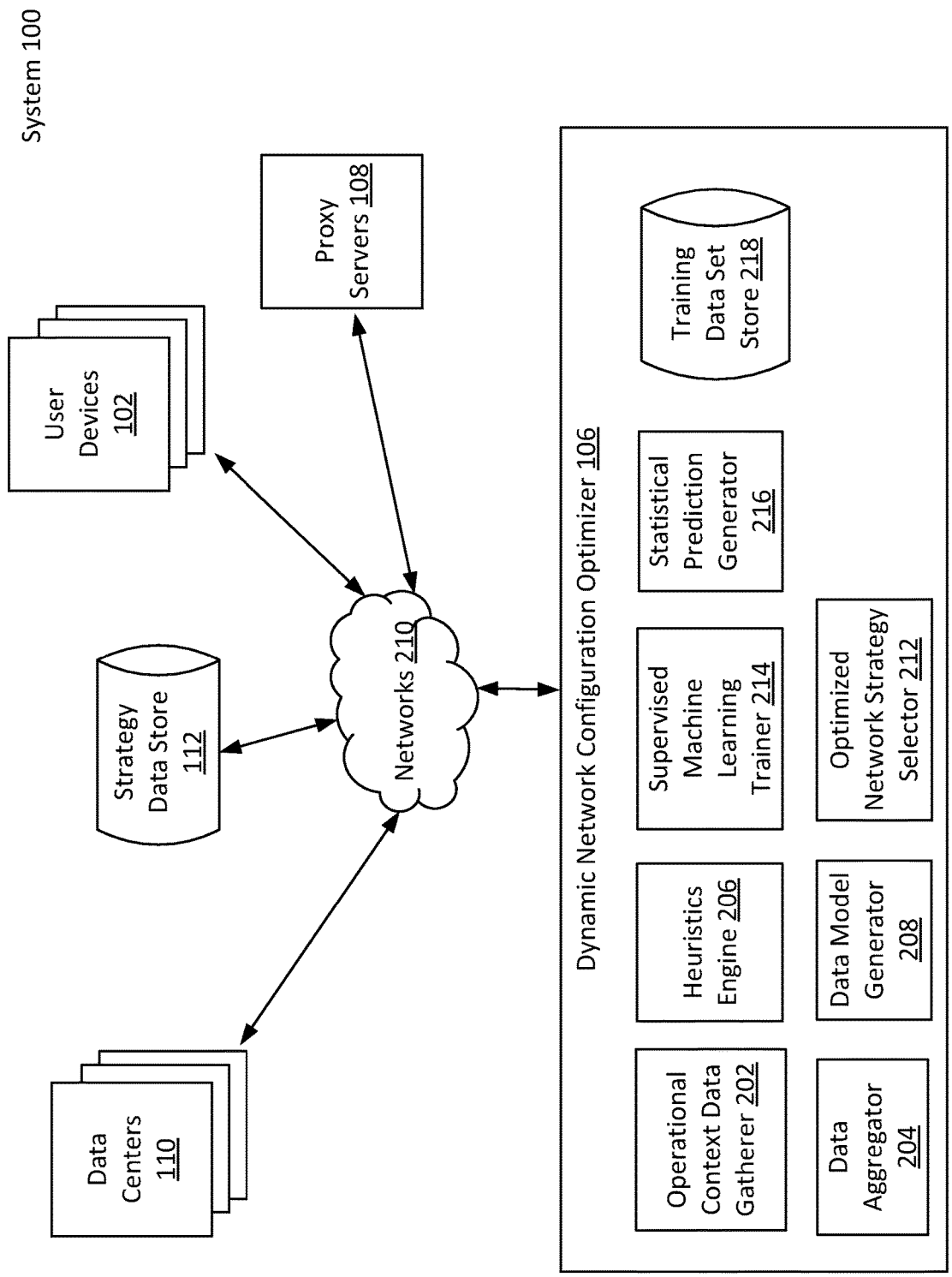
FIG. 2 illustrates a high-level block diagram, including an example dynamic network configuration optimizer according to an embodiment of the invention.

FIG. 2 illustrates a high-level block diagram, including an example dynamic network configuration optimizer, according to an embodiment. A dynamic network configuration optimizer 106 may include an operational context data gatherer 202, a data aggregator 204, a heuristics engine 206, a data model generator 208, a supervised machine learning trainer 214, a statistical prediction generator 216, a training data set store 218, and an optimized network strategy selector 212, in one embodiment. The dynamic network configuration optimizer 106 may communicate data over one or more networks 210 with other elements of system 100, such as user devices 102, one or more proxy servers 108, data centers 110, and one or more strategy data stores 112.

An operational context data gatherer 202 gathers network stack values associated with data requests between user devices 102 and data centers 110 through one or more proxy servers 108. In one embodiment, a network stack data value may be gathered by an agent 114 of a user device 102 or from an accelerator 116 on the proxy server 108. The operational context data gatherer 202 stores operational context data, defined as a set of network stack data values associated with a particular user device 102 during a particular asset transaction, in training data set store 218, in an embodiment. Each operational context data is a result of configuration data values at the user device 102 associated with a network stack at a point in time, in an embodiment.

A data aggregator 204 aggregates data values over a fixed period of time (e.g., a month, a week, a day, an hour, a minute, a second, etc.) for each combination of operational context and strategy. A particular combination of operational context and strategy may be referred to herein as a control field. Each aggregated row becomes a data point with information on the "goodness" of the strategy used. Further, the distribution of control field values in this data set is representative of the mobile network traffic that is aimed for optimization. Every strategy can be modeled as an inverse problem: a function of the download outcomes. For example, a moving average of the download complete time values for a particular combination of an operational context having a set of network stack values and strategy may be identified as the lowest (e.g., the fastest, etc.) download complete time across all strategies. As a result, the particular combination of operational context and strategy may be a good estimate of the best value for the network stack values in the strategy. This good estimate of the best value for the network stack value may be used as a set of data points on which a machine may be trained in a "supervised" way, further described below as supervised learning method 400, in one embodiment.

A heuristics engine 206 incorporates knowledge known to administrators of the dynamic network configuration optimizer 106. A heuristic is a technique, method, or set of rules designed for solving a problem more quickly when classic methods are too slow, or for finding an approximate solution when classic methods fail to find any exact solution. Here, the heuristics engine 206 may incorporate knowledge known to the designers of the supervised learning method and techniques described herein to estimate network stack values, such as supervised learning method 400 below. For example, a particular carrier, such as AT&T, may have a maximum throughput of 50 MB/sec based on historical data. Thus, an endpoint, or user device 102, for example, may throttle a transmission rate, a particular network stack value, to a range of 20 to 30 MB/sec to ensure faster transmission and minimize the risk of packet loss.

A data model generator 208 generates one or more data models to estimate network stack values as described above. Given the possibility of network changes over time and the deterministic nature of identifying optimal network stack values using operational contexts and strategies, the data model generator 208 identifies an iterative process for a supervised learning algorithm, or method 400, to train a machine to achieve desired outputs. Here, the estimation of the best value of a single parameter given the control fields using the performance information in the data points follows a two-step Bayesian learning algorithm. First, the estimation of the best value is based on a generative module where the network stack value is an inverse function of the download outcomes such as throughput, time to first byte, and download complete time. A prediction algorithm is used to estimate the optimal value of this network stack value. In this way, a set of data points may be generated to train the machine as a result of the supervised learning algorithm, or method 400.

After the best value of a single parameter is estimated based on a model generated by the data model generator 208, the posteriori probability of good performance is measured conditioned on the parameter estimate and other strategies. For example, if the posteriori probability is high, the optimizer 106 may then choose this policy for use on future network traffic. This probability is estimated using information from other estimated or set network stack values hence taking into account possible dependencies using a statistical prediction generator 216, for example. For multiple network stack value estimation, this process is either parallelized if the parameters are independent in probability distribution or the estimation of the parameters is performed in cascade if independence cannot be determined. A supervised machine learning trainer 214 may iterate this two-step Bayesian learning algorithm using the generated datasets described above, stored in a training data set store 218.

An optimized network strategy selector 212 selects a network configuration strategy based on the optimal choice. The objective function of the black box optimization is a function of performance improvement in throughput and download complete time, network congestion, and other network parameters. The optimization is constrained on thresholds for performance improvement metrics and traffic share. The black box algorithm outputs a set of network stack values which optimizes the objective function subject to the constraints. It operates on data aggregated over some period of time (e.g., one or more years, months, days, hours, minutes, seconds, etc.) and has no memory in the choice of statistics used to calculate this objective function and is purely deterministic.

In order to constrain the parameter space and generate relevant data sets to train the model on, the black box algorithm and the generation of strategies may be used in tandem by a supervised machine learning trainer 214 over multiple iterations. This gives the learning framework an adaptive nature. The strategies ensure that the adaptive learning framework explores the entire network stack value space and does not lead to focusing on local optima. The black box optimization algorithm guides the learning framework to focus on parts of the space where performance improvements are likely to result. Because the learning algorithm has memory and is used in tandem with the above elements, the network stack value estimates have achieved a tradeoff between maximizing performance improvement over unoptimized network performance and generating stable estimates that do not fluctuate with short term network fluctuations, while enabling estimates to evolve over time. Here, the system is dynamically improved using machine learning techniques and the technology that is used to perform network transactions overall, as a client device using the selected set of best values, improves network performance of that client device and thereby improves the user experience above and beyond previous approaches.

A statistical prediction generator 216 may be used to generate calculations used in statistical prediction, including probability distributions, Bayesian probability, moving averages, regression analysis, predictive modeling, and other statistical computations. A training data set store 218 may be used to store training set data for generated data models, as described above. The training data set store 218 may include a subset of data stored on the strategy data store 112, in one embodiment.

The optimized network strategy selector 212 ensures the selected strategy is delivered to a user device 102 based on the received operational context. A network policy may be chosen based on the above described techniques and is propagated by configuring a network interface on the user device 102 through an agent 114, in an embodiment. The optimized network strategy selector 212 sends instructions (e.g., as part of a client-side policy) to a user device 102 where, upon compilation of the instructions, implements the chosen network configuration strategy by setting the appropriate network stack values.

4. CONVERGENCE ON OPTIMUM STRATEGY FOR OPERATIONAL CONTEXTS

Figure 3:
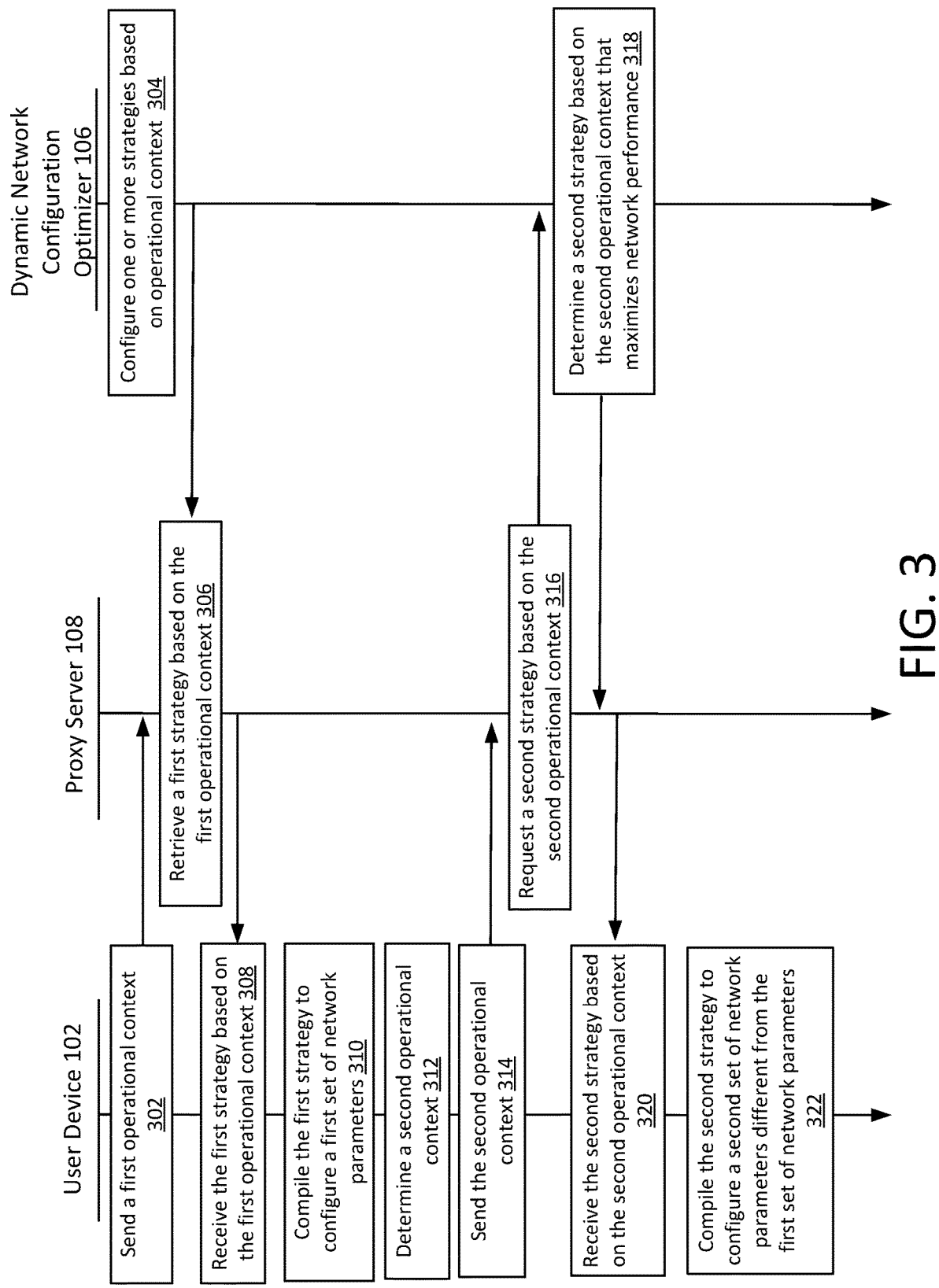
FIG. 3 illustrates a high-level interaction flow diagram of dynamic network configuration optimization, according to an embodiment of the invention.

FIG. 3 illustrates a high-level interaction diagram of dynamic network configuration optimization, according to an embodiment. A user device 102 sends 302 a first operational context to a proxy server 108. A dynamic network configuration optimizer 106 configures 304 one or more strategies based on operational context. In response to the proxy server 108 receiving a first operational context, the proxy servers 108 retrieves 306 a first strategy based on the first operational context. The user device 102 receives 308 the first strategy based on the first operational context from the proxy server 108. Such a first strategy may include network stack values such as transport protocols to use for particular URLs that may affect network performance such as download completion time, time to first byte, and throughput, for example.

The first strategy is compiled 310 at the user device 102 to configure a first set of network parameters. Later, a second operational context is determined 312. The second operational context may include different usage patterns, different networks being used to transact data, and the other types of operational context mentioned above. The second operational context is sent 314 to the proxy server 108. A second strategy is requested 316 based on the second operational context from the dynamic network configuration optimizer 106.

A second strategy is determined 318 based on the second operational context that maximizes network performance. This second strategy is then sent to the proxy server 108 responsive to the request and then the second strategy is received 320 by the user device 102 based on the second operational context. The second strategy is then compiled 322 to configure a second set of network parameters different from the first set of network parameters.

This interaction diagram illustrates how a strategy is converged upon based on differing operational context. For example, file size may be a dominant characteristic that affects a strategy that enables throughput of 1 MB to 20 MB. Because file size may vary according to the user device task, such as small file downloads (e.g., web browsing, etc.) versus large file downloads (e.g., video streaming, etc.), file size may be a hidden variable that dominates the strategy, causing a failure of convergence on a single strategy. Here, the differing operational context translates to different strategies being applied. Other hidden variables may include server behavior, user device behavior, and network congestion.

The following is an example code snippet of the CSP (compilation stage):
Server sends:
S_POLICY (static, default):
S_Enable_acceleration=0
S_Enable_logging=0
S_POLICY (dynamic; applied only when CSP matches)
S_MATCH
C_Current_URL
S_REGEX: ^haps://(.*)jpg
S_Enable_acceleration=1
S_Enable_logging=1
Client received the CSP and compiles it successfully
CSP is stored in the memory now.
S_variables are server-side specific. C_variables are client-side specific.
Now, an example of the Client serving request to www dot salesforce dot com with the above mentioned CSP compiled and stored in the memory:
Client received the CSP and compiles it successfully
S_POLICY (static, default):
S_Enable_acceleration=0
S_Enable_logging=0
S_POLICY (dynamic; applied only when CSP matches)
S_MATCH
https://www.salesforce.com
S_REGEX: ^haps://(.*)jpg$
S_Enable_acceleration=1
S_Enable_logging=1
CSP engine runs the program.

Attempts to match a pattern ^https://(.*)jpg$ fails (request isn't for a file ending with jpg)
Resulting policy is:
  S_POLICY (static, default):
    S_Enable_acceleration=0
    S_Enable_logging=0
Counter-example resulting policy with a request to www dot salesforce dot com/logo.jpg would be:
  S_POLICY (static, default):
    S_Enable_acceleration=1
    S_Enable_logging=1
Because the requested URL (www dot salesforce dot com/logo.jpg) would match the pattern ^https://(.*)jpg$, the values from a dynamic policy would be applied.

Figure 4:
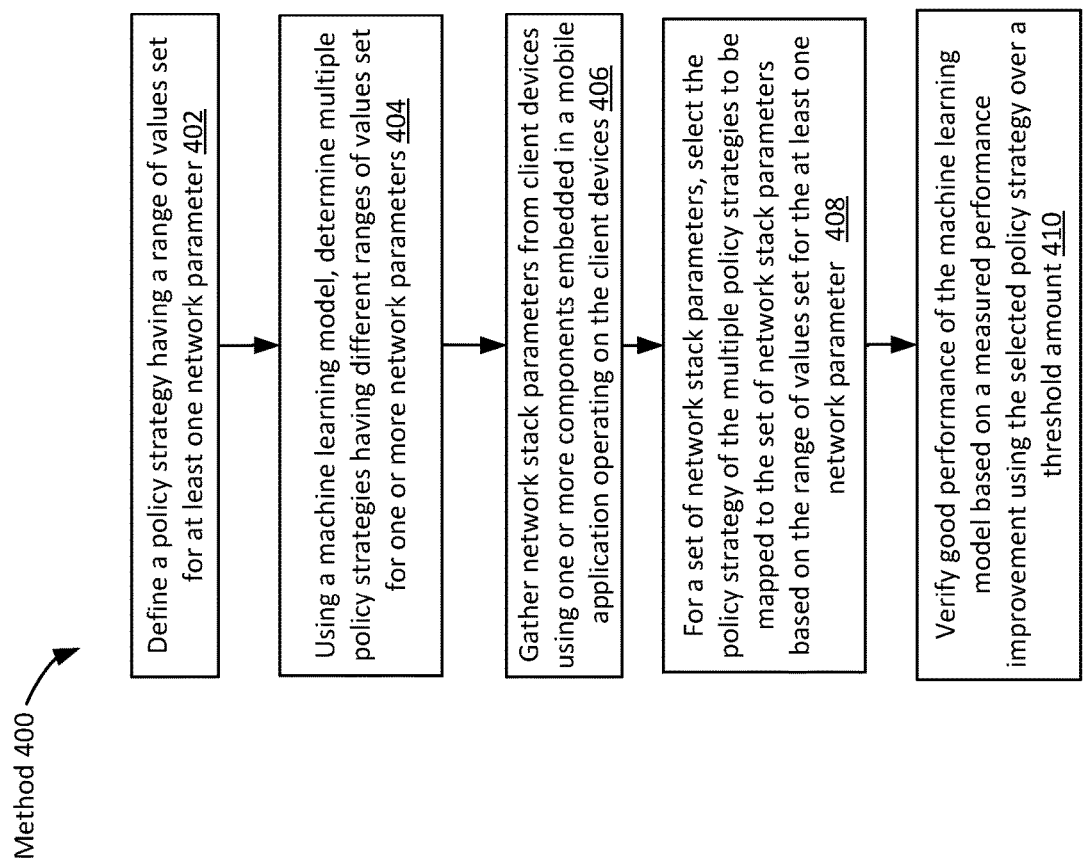
FIG. 4 illustrates a flowchart for dynamic network configuration optimization, according to an embodiment of the invention.

FIG. 4 illustrates a flowchart for dynamic network configuration optimization, according to an embodiment of the invention. Method 400, using the supervised machine learning trainer 214 and data model generator 208, among other components in the dynamic network configuration optimizer 106 as described above, may be used in dynamic network configuration optimization, in an embodiment. A policy strategy having a range of values set for at least one network parameter may be defined 402. This policy strategy may be defined 402 based on known information and/or heuristics, for example. Using a machine learning model, multiple policy strategies having different ranges of values set for one or more network parameters are determined 404. Network stack parameters are gathered 406 from client devices using one or more components embedded in a mobile application operating on the client devices.

For a set of network stack parameters, the policy strategy of the multiple policy strategies is selected 408 to be mapped to the set of network stack parameters based on the range of values set for the at least one network parameter.

Good performance of the machine learning model is verified 410 based on a measured performance improvement using the selected policy strategy over a threshold amount. For example, a threshold amount for a network stack parameter, such as transmission rate, may be 10%, meaning that the performance improvement should be over 10% of the unoptimized network configuration. If the model is not verified 410, method 400 may repeat until the model converges.

The machine learning model enabled method 400 above allows more efficient analysis of system problems. This may enable automatic or operator-initiated modifications to system parameters that increases efficiency of the overall system performance, increases the efficiency of server and/or client computing performance, and aides in the systematic handling of problems that cause network performance issues from the viewpoint of the client device.

Characteristics of modern networks change at a very rapid clip. The diversity of devices, content, device types, access mediums, etc., further compound the volatility of the networks. These facets make the problem hard to characterize, estimate or constrain resulting in inefficient, slow and unpredictable delivery of any content over these networks. However, there is a lot of information about the network available in the transit traffic itself—from billions of devices consuming data. This information that describes network operating characteristics and defines efficacy of data delivery strategies is called a "network imprint". The approaches described herein allow embodiments to compute this network imprint. Embodiments include an apparatus comprising a processor and configured to perform any one of the foregoing methods. Embodiments include a computer readable storage medium, storing software instructions, which when executed by one or more processors cause performance of any one of the foregoing methods. Note that, although separate embodiments are discussed herein, any combination of embodiments and/or partial embodiments discussed herein may be combined to form further embodiments.

5. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
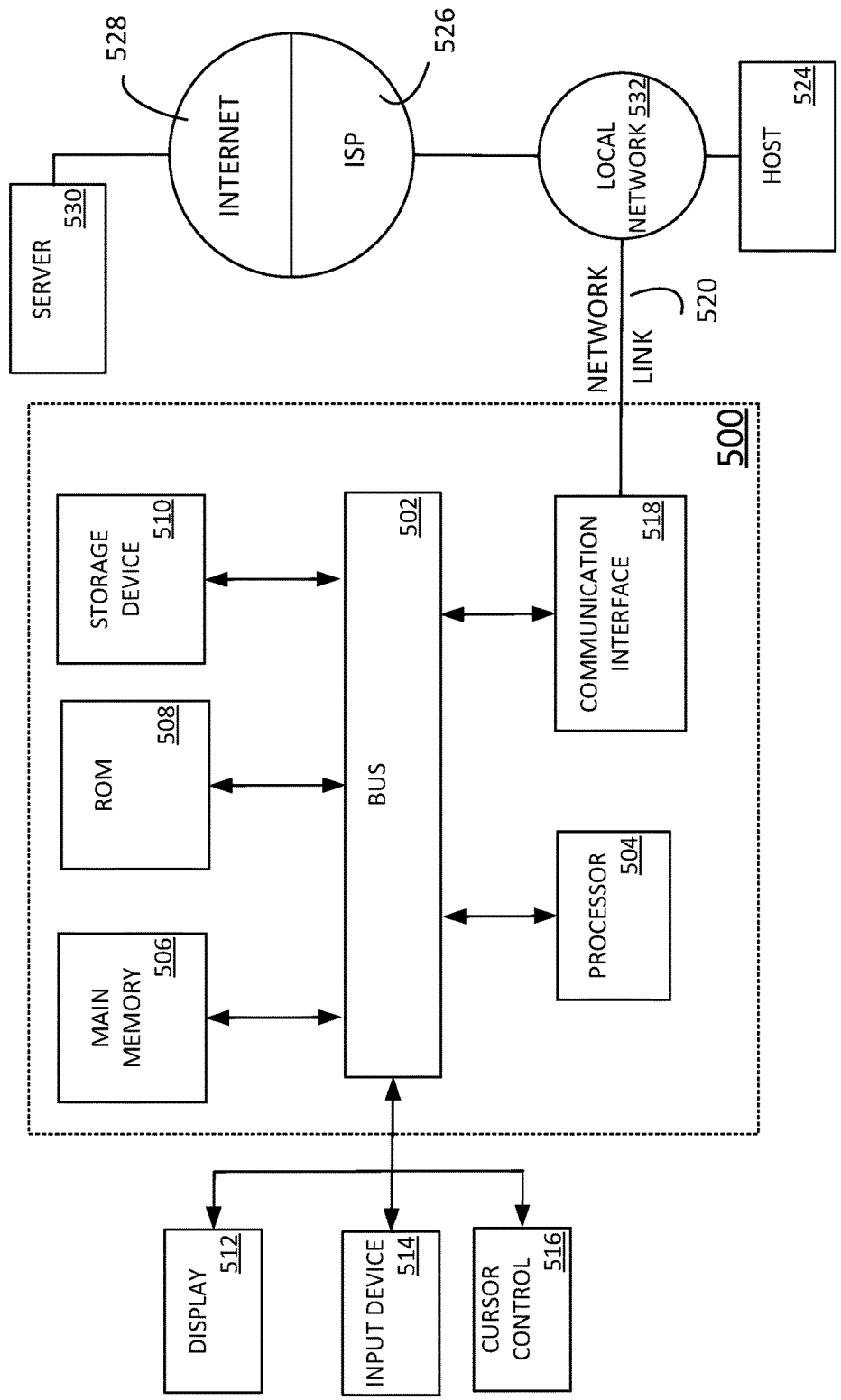
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6. EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:

receiving, at a proxy server, a first operational context from an agent at a user device, wherein the agent is included in a software development kit installed on the user device;

determining a first strategy having a first set of network stack values based on the first operational context;

causing configuration of the user device according to the first strategy by sending the first strategy to the user device;

receiving a second operational context from the agent;

determining a second strategy based on the second operational context;

causing configuration of the user device according to the second strategy by sending the second strategy to the user device, the second strategy having a second set of network stack values different from the first set of network stack values;

storing aggregated performance data associated with the first strategy and the second strategy in a strategy data store;

for each combination of operational context and applied strategy in the strategy data store:

estimating a set of best values for a selected set of network stack values associated with the applied strategy;

comparing the set of best values for the selected set of network stack values to a calculated set of network stack values determined from a black box optimization;

determining a performance improvement of the selected set of network stack values based on the applied strategy and the calculated set of network stack values determined from the black box optimization; and verifying the set of best values for the selected set of network stack values based on the performance improvement being over a threshold associated with the applied strategy.

2. The method as recited in claim 1, further comprising determining a network configuration strategy having the set of best values for the selected set of network stack values similar to future received operational contexts.

3. The method as recited in claim 2, wherein the proxy server comprises an accelerator to translate the future received operational context to the associated network configuration strategy in the strategy data store.

4. The method as recited in claim 2, wherein the agent implements the network configuration strategy at the user device.

5. The method as recited in claim 1, wherein the first strategy is determined, in part, using at least one supervised machine learning technique.

6. The method as recited in claim 1, wherein the aggregated performance data is gathered by at least one of the proxy server and the user device.

7. The method as recited in claim 1, further comprising:
dynamically determining a network configuration strategy having the best value for the set of network stack values based on a recently received operational context.

8. A non-transitory computer readable medium storing a program of instructions that is executable by a device to perform a method, the method comprising:
receiving, at a proxy server, a first operational context from an agent at a user device, wherein the agent is included in a software development kit installed on the user device;
determining a first strategy having a first set of network stack values based on the first operational context;
causing configuration of the user device according to the first strategy by sending the first strategy to the user device;
receiving a second operational context from the agent;
determining a second strategy based on the second operational context;
causing configuration of the user device according to the second strategy by sending the second strategy to the user device, the second strategy having a second set of network stack values different from the first set of network stack values;
storing aggregated performance data associated with the first strategy and the second strategy in a strategy data store;
for each combination of operational context and applied strategy in the strategy data store:
estimating a set of best values for a selected set of network stack values associated with the applied strategy;

comparing the set of best values for the selected set of network stack values to a calculated set of network stack values determined from a black box optimization;

determining a performance improvement of the selected set of network stack values based on the applied strategy and the calculated set of network stack values determined from the black box optimization; and verifying the set of best values for the selected set of network stack values based on the performance improvement being over a threshold associated with the applied strategy.

9. The non-transitory computer readable medium as recited in claim 8, the method further comprising determining a network configuration strategy having the set of best values for the selected set of network stack values similar to future received operational contexts.

10. The non-transitory computer readable medium as recited in claim 9, wherein the proxy server comprises an accelerator to translate the future received operational context to the associated network configuration strategy in the strategy data store.

11. The non-transitory computer readable medium as recited in claim 9, wherein the agent implements the network configuration strategy at the user device.

12. The non-transitory computer readable medium as recited in claim 8, wherein the first strategy is determined, in part, using at least one supervised machine learning technique.

13. The non-transitory computer readable medium as recited in claim 8, wherein the aggregated performance data is gathered by at least one of the proxy server and the user device.

14. The non-transitory computer readable medium as recited in claim 8, the method further comprising:
dynamically determining a network configuration strategy having the best value for the set of network stack values based on a recently received operational context.

15. An apparatus, comprising:
a network configuration optimizer, implemented at least partially in hardware, configured to receive at a proxy server, a first operational context from an agent at a user device, wherein the agent is included in a software development kit installed on the user device;
wherein the network configuration optimizer is further configured to determine a first strategy having a first set of network stack values based on the first operational context;
wherein the network configuration optimizer is further configured to cause configuration of the user device according to the first strategy by sending the first strategy to the user device;
wherein the network configuration optimizer is further configured to receive a second operational context from the agent;
wherein the network configuration optimizer is further configured to determine a second strategy based on the second operational context;
wherein the network configuration optimizer is further configured to cause configuration of the user device according to the second strategy by sending the second strategy to the user device, the second strategy having a second set of network stack values different from the first set of network stack values;
a data aggregator, implemented at least partially in hardware, configured to store aggregated performance data associated with the first strategy and the second strategy in a strategy data store;

a network strategy selector, implemented at least partially in hardware, that for each combination of operational context and applied strategy in the strategy data store is configured to:
  estimate a set of best values for a selected set of network stack values associated with the applied strategy;
  compare the set of best values for the selected set of network stack values to a calculated set of network stack values determined from a black box optimization;
  determine a performance improvement of the selected set of network stack values based on the applied strategy and the calculated set of network stack values determined from the black box optimization; and
  verify the set of best values for the selected set of network stack values based on the performance improvement being over a threshold associated with the applied strategy.

16. The apparatus as recited in claim 15, wherein the network strategy selector is further configured to determine a network configuration strategy having the set of best values for the selected set of network stack values similar to future received operational contexts.

17. The apparatus as recited in claim 16, wherein the proxy server comprises an accelerator to translate the future received operational context to the associated network configuration strategy in the strategy data store.

18. The apparatus as recited in claim 16, wherein the agent implements the network configuration strategy at the user device.

19. The apparatus as recited in claim 15, wherein the first strategy is determined, in part, using at least one supervised machine learning technique.

20. The apparatus as recited in claim 15, wherein the aggregated performance data is gathered by at least one of the proxy server and the user device.

* * * * *